Sept. 15, 1942.   W. H. GRINT   2,295,840
UNION FOR FLEXIBLE TUBING
Filed Aug. 4, 1938   2 Sheets-Sheet 1

Inventor
W. H. GRINT.
by
Attorneys

Sept. 15, 1942.        W. H. GRINT        2,295,840
UNION FOR FLEXIBLE TUBING
Filed Aug. 4, 1938         2 Sheets-Sheet 2

INVENTOR
W. H. GRINT.
BY
Blair & Kilcoyne
ATTORNEYS

Patented Sept. 15, 1942

2,295,840

UNITED STATES PATENT OFFICE 2,295,840

UNION FOR FLEXIBLE TUBING

William Horace Grint, Slough, England

Application August 4, 1938, Serial No. 223,090
In Great Britain August 12, 1937

2 Claims. (Cl. 285—84)

This invention relates to unions for flexible pipes or tubing. It has heretofore been the practice to secure a union and a flexible pipe together by some external device which compresses the pipe on to the body of the union, examples of such device being clips, wire serving, and split tapered sleeves closed by a screwed-on ring. These devices usually have undesirable protuberances, are somewhat expensive to make and are comparatively heavy.

One object of the present invention is a method of attaching a flexible pipe to a union having a tubular body adapted to lie within one end of the pipe, said method comprising the step of expanding said tubular body while the latter is within said end of the pipe and while said end is surrounded by a rigid sleeve, thereby clamping the pipe between said sleeve and said union. An efficient joint is thus readily effected with a minimum of weight and cost. The outside diameter of the union body may be the same as that of the bore of the pipe, so that the union can be inserted readily without twisting and there is no risk of damage to the inner surface of the pipe. The method enables a joint to be made between the whole length of the tubular body and the pipe, the compression of the pipe wall varying gradually from points of no compression to points of maximum compression.

A further object of the invention is a pipe union having a tubular body adapted to lie within one end of a pipe and to be expanded by the passage of a ram through the union to clamp the wall of the pipe between said union and an external sleeve.

Yet another object of the invention is an assembly comprising in combination a flexible pipe, an expanded union lying within one end of the pipe, and a rigid sleeve surrounding said end.

The invention further comprises the methods, elements and combinations of parts set forth in the annexed claims.

In order that the invention may be clearly understood, examples thereof will now be described with reference to the accompanying drawings, in which—

Figure 1:
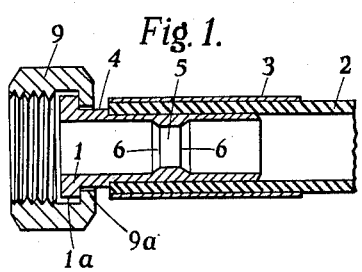
Figure 1 is a sectional side elevation of an assembly including a union in position to be securely attached to a flexible pipe.

In Figure 1, the union is a metal tube 1 having an external cylindrical surface of diameter substantially equal to that of the internal diameter of the flexible pipe or tubing 2, to which the union is to be secured. It will be seen that the union is pushed into the end of the pipe 2 and that the latter is surrounded by a sleeve 3 having a thin metal wall. The distance by which the union 1 can be pushed into the pipe 2 is limited by a shoulder 4. The union 1 is formed about midway along the length of the thin part of its wall with an annular internal projection 5 having bevelled ends 6.

Figure 1A:
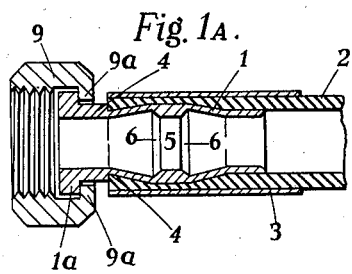
Figure 1A is an elevation, similar to Figure 1, showing the assembly after the union has been secured to the pipe.

To secure the union 1 to the pipe 2, a ram having a tapered end is forced through the union so as to expand the internal projection 5 to an inside diameter substantially equal to that at the ends of the bore through the union. The result of this is that the union 1 takes the configuration shown in Figure 1A and the flexible pipe 2 is clamped securely between the expanded part of the union and the sleeve 3.

The union carries a female nut 9 having an internal flange 9a at one end which lies behind an external flange 1a on the union 1. The flanges prevent the nut 9 from being pulled off the union. The nut 9 is, of course, intended to be screwed on to a male part of a further union, which may be secured to a further flexible pipe in a manner similar to that shown in Figure 1A.

A ram 7, of the kind mentioned above, is shown in Figure 2 which also shows a clamp for holding the assembly while the union is being expanded. This figure shows a modified form of union, the latter initially having an untapered external surface with a parallel internal surface terminating at the inner end of the union in an annular, cylindrical, projection 5A. The ram 7 is cylindrical and has a diameter such as to provide a sliding fit in the main part of the union 1, the ram terminating in a conical end 7a. When the ram is forced through the union, as by a sharp blow delivered manually on the head 8, the internal annular projection is expanded so as to cause the external surface of the union to diverge as shown in Figure 2A, so that the flexible tube 2 is gripped securely between the union and the sleeve 3.

Figure 2:
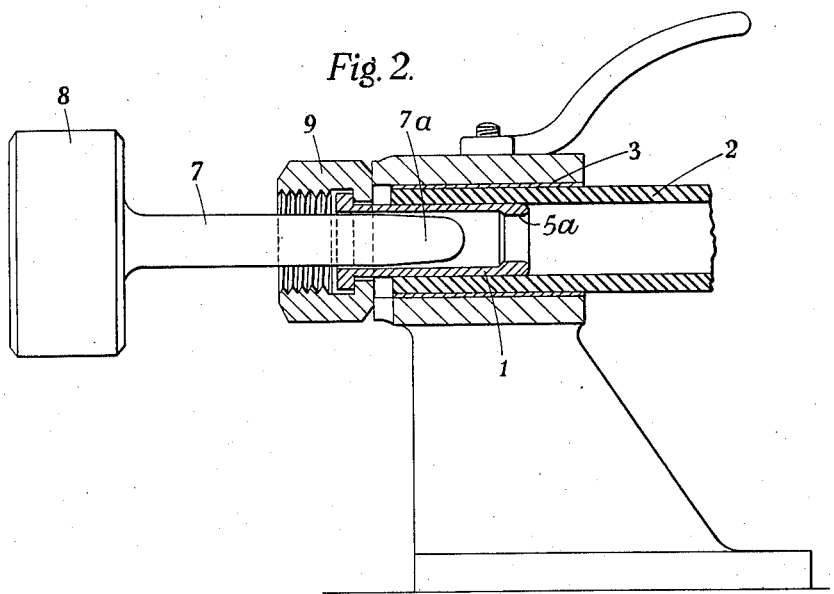
Figure 2 is a sectional side elevation of a further assembly, including a union in position to be secured to a flexible pipe, and of means for expanding the union into the pipe.
Figure 2A:
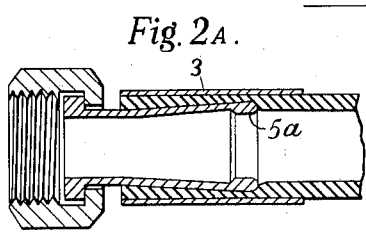
Figure 2A is a sectional side elevation showing the assembly of Figure 2 after the union has been secured to the pipe.
Figure 3:
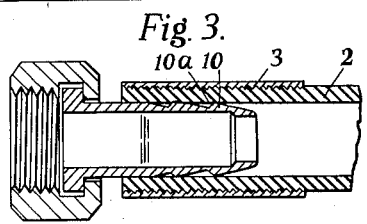
Figures 3 and 4 show further assemblies, each including a union in position to be secured to a flexible pipe.

Figure 3 shows a modification of the union in Figures 2 and 2A, the external surface of the tubular body of the union being formed with annular ridges 10 which bite into the tube 2 when the union is expanded. These ridges 10 provide faces 10a which assist in preventing the union from being pulled out of the tube 2 after the union has been secured to the tube. The sleeve 3 is formed with a fine internal thread which bites into the pipe 2 when the union is expanded and serves to increase the grip between the sleeve 3 and the pipe 2.

Figure 4:
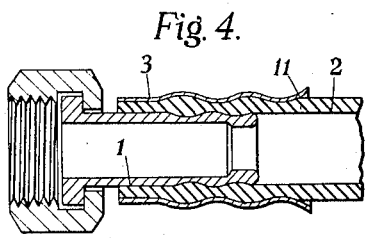

The sleeve 3 may have an undulating configuration, as shown in Figure 4, and it may be formed with a flared mouth 11. The external surface of the union may also have an undulating configuration, as shown in Figure 4, so that, when the union is expanded, the pockets, provided between the undulating inner surface of the sleeve 3 and the undulating external surface of the union 1, assist in preventing the pipe 2 from being pulled out of the space between the union 1 and the sleeve 3. The flared mouth 11 is provided to prevent a kink being formed in the pipe 2 when the latter is bent at the point where it emerges from the sleeve 3.

Figure 5:
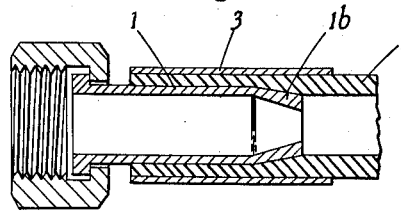
Figure 5 is a sectional side elevation of an assembly including a union designed to have a bore the same as that of the pipe in which it lies.
Figure 5A:
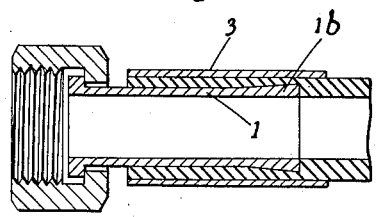
Figure 5A is an elevation, similar to Figure 5, showing the assembly after undergoing a finishing operation.

The assembly of Figures 5 and 5A differs from those shown in the other figures because the union 1 has an initial external diameter which is substantially greater than the internal diameter of the pipe 2 which is necessary to enable the union bore to be the same as the pipe bore. The union 1, therefore, has to be forced into the pipe 2, and, to enable this to be done, the union 1 is formed at its inner end with a tapered part 1b. When the union has been forced into the position shown in Figure 5, a ram is driven through the union to expand the tapered part 1b, which is thickened towards its inner end to bite into the pipe. The ram has no effect on the untapered part of the union and its effect on the tapered part is, as shown in Figure 5A, to bring this parallel with the untapered part. An advantage of this arrangement is that, in the finished assembly, the union has a bore of constant diameter equal to the internal diameter of the pipe.

Figure 6:
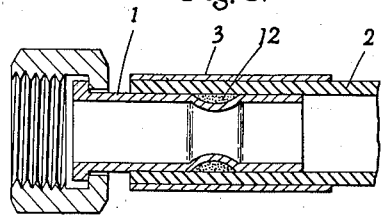
Figures 6, 7 and 8 show the assemblies of Figures 6, 7 and 8 after the union have been securely attached to the pipes.
Figure 6A:
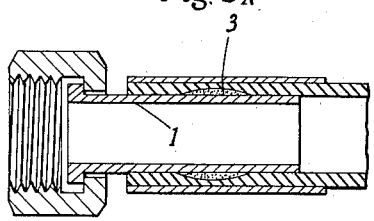
Figures 6A, 7A and 8A shows the assemblies of Figures 6, 7 and 8 after the unions have been securely attached to the pipes.

The union 1 in the assembly of Figures 6 and 6A is initially formed with a groove 12 providing an annular pocket in which a deformable jointing material is located. The external diameter of the tubular body of the union is initially substantially equal to the internal diameter of the pipe 2 so that the union can easily be slipped into the end of the pipe. To secure the union to the pipe, a ram, similar to that shown in Figure 2, is forced through the union so as to expand that part of the union wall which provides a groove 12. The internal surface of the union 1 is then parallel along its length, and the jointing material causes the formation of an annular pocket in the pipe 2, as shown in Figure 6A. The jointing material lies in this pocket and causes the pipe 2 to be gripped securely between the union 1 and the external sleeve 3. The deformable jointing material may be a deformable metal such as a ring of soft lead or soft copper, or it may be of india-rubber or synthetic rubber. Yet again, it may merely be a viscous jointing composition, of which a suitable example is that sold under the trade name "Heldite." The latter is resistant to petrol and oils.

Figure 7:
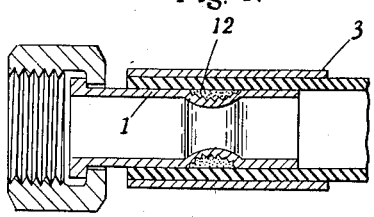
Figure 7A:
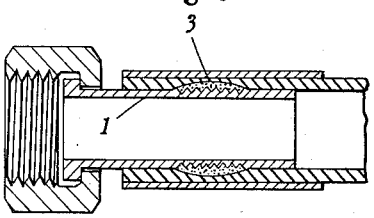

The assembly of Figures 7 and 7A is similar to that of Figures 6 and 6A, except that the surface of the annular groove 12 is formed with teeth which, when the union has been expanded, serve to increase the grip of the jointing material.

Figure 8:
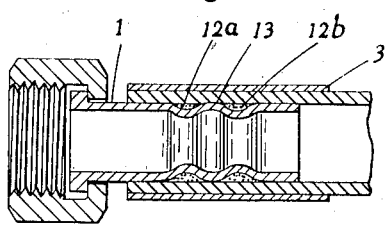
Figure 8A:
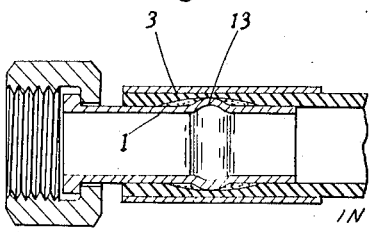

Figures 8 and 8A show a further modification of the arrangement of Figures 6 and 6A, in which two annular grooves 12a and 12b containing deformable jointing material are formed in the union 1. In this arrangement, after the ram has been forced through the union, the part 13 of the latter lying between the grooves 12a and 12b, provides an annular external bulge, as shown in Figure 8A.

All the unions particularly described above are made of a metal which can be readily expanded without cracking. A suitable metal is Delta metal, which, as is well known, consists of brass to which a small proportion of iron has been added.

The ram used for expanding the unions may, instead of being arranged as shown in Figure 2, be arranged to be manually operated through a lever. Alternatively, the ram may be power-operated, as by hydraulic pressure.

The pipe may have internal helical wire armouring and, in that event, the external surface of the union may advantageously be formed with a helical groove, which receives the armouring.

The union may provide any desired form of connection. The unions shown in the drawings have female nuts, but they may have male parts, flanged parts or any other suitable connecting elements. Further, the unions may provide discharge nozzles.

The flexible pipe may be a woven or braided pipe, rubber hose pipe or any other flexible pipe that is suitable for the unions in question.

I claim:

1. A tubular union for flexible pipes adapted to be inserted in the pipe and comprising a narrow internal annular projection near one end of substantial radial thickness, the opposite end having a flange projecting beyond the end of the flexible pipe, a screw threaded nut free to rotate thereon, and a separate external rigid cylindrical member with an internal bore of substantially the same diameter as the external dimensions of the flexible pipe fitting over the outside end of said pipe whereby on the insertion of a ram into the union to engage the annular projection, said projection and approximately one-half of the adjacent wall only of the tubular union will be forced radially outwardly to compress the flexible pipe between the external surface of the union and the internal surface of the rigid cylindrical member whereby on withdrawing the ram an internal bore slightly less in diameter than that of the flexible pipe remains with the internal diameter of the union in the plane of the projection less than the minimum diameter of the pipe.

2. A tubular union of the character set forth in claim 1, in which the internal wall of the external rigid cylindrical member is screw-threaded and the exterior surface of the tubular union is provided with an external annular groove.

WILLIAM HORACE GRINT.